United States Patent
Choi (10) Patent No.: US 6,975,273 B1
(45) Date of Patent: Dec. 13, 2005

(54) ANTENNA WITH CAMERA LENS ASSEMBLY FOR PORTABLE RADIOTELEPHONE

(75) Inventor: Chi-Jeong Choi, Suwon (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 10/464,032

(22) Filed: Jun. 17, 2003

(51) Int. Cl.[7] .......................... H01Q 1/24; H04B 1/38; H04M 1/00
(52) U.S. Cl. .................. 343/702; 343/720; 455/556.1; 455/575.7; 379/433.1
(58) Field of Search ................................ 343/702, 720; 455/556.1, 575.1, 575.7; 379/433.1

(56) References Cited

U.S. PATENT DOCUMENTS

| | | | |
|---|---|---|---|
| 5,666,159 A * | 9/1997 | Parulski et al. | 348/211.2 |
| 5,982,853 A * | 11/1999 | Liebermann | 379/52 |
| 6,069,648 A * | 5/2000 | Suso et al. | 348/14.02 |
| 6,259,407 B1 * | 7/2001 | Tran | 343/700 MS |
| 6,308,084 B1 * | 10/2001 | Lonka | 455/556.1 |

FOREIGN PATENT DOCUMENTS

KR  10-2004-0046655  6/2004

* cited by examiner

Primary Examiner—Michael C. Wimer
(74) Attorney, Agent, or Firm—Dilworth & Barrese LLP (57) ABSTRACT

The present invention relates to a portable radiotelephone with an antenna unit outwardly protruded therefrom. In the portable radiotelephone, the antenna unit is connected, via a feeding unit, to a main body of the radiotelephone and has a camera lens assembly installed in a proper position thereof to the main body so as to suitably photograph a subject. Accordingly, an additional area for an installation of the lens assembly in the radiotelephone is not required, and miniaturization and reduction in weight of the radiotelephone can be achieved. In addition, since the lens assembly is installed in the most protruded portion of the radiotelephone, it is possible to suitably photograph a subject.

16 Claims, 8 Drawing Sheets

ANTENNA WITH CAMERA LENS ASSEMBLY FOR PORTABLE RADIOTELEPHONE

BACKGROUND OF THE INVENTION

PRIORITY

This application claims priority under 35 U.S.C. § 119 to an application entitled "ANTENNA WITH CAMERA LENS ASSEMBLY FOR PORTABLE RADIOTELEPHONE" filed in the Korean Industrial Property Office on Dec. 24, 2002 and assigned Serial No. 2002-83083, the contents of which are incorporated herein by reference.

1. Field of the Invention

The present invention relates to an antenna unit for a portable radiotelephone and, more particularly, to an antenna unit with a camera lens assembly for a portable radiotelephone, in which the camera lens assembly used as an optical photographing device is installed in a proper position of the antenna unit, thus allowing suitable photographing of a subject.

2. Discussion of the Related Art

As use of portable radiotelephones increasingly spreads, portable radiotelephones with various functions and designs have come into the market. The radiotelephones that have been developed include a general bar type, a flip type, a flip-up type, a folder type and so on. Recently, the folder type radiotelephone has become main stream. That is because the folder type radiotelephone has sufficient space to employ a wide LCD module. In addition, since the folder type radiotelephone can be folded in half, it is better than other radiotelephones in the aspect of portability.

Further, recently, with development of an electronic communication industry, there is a tendency for a portable radiotelephone to be more compact, light and miniaturized and also its functions tend to be various. For example, a speaker unit that can implement the melody of various harmonies is installed. A color display device consisting of tens of thousands to hundreds of thousands of pixels is implemented and these days it is devoted to the development of these functions much more.

Portable radiotelephones having various functions to support high-quality color displays have come into the market. For example, the portable radiotelephone performs image communications, and an optical photographing unit used as a digital camera or a camcorder is provided in the radiotelephone. A small-sized camera lens assembly is generally used as the optical photographing unit. The camera lens assembly tends to change from a detachable type as a transition mode to a built-in type. In case of the built-in camera lens assembly, the camera lens assembly is generally installed on a hinge arm for mechanically connecting a main body with a folder as a sub body. The installed optical photographing unit is rotatable by 360° with respect to a hinge axis. Accordingly, a user can photograph a desired subject at a desired position and time using the radiotelephone with the built-in optical photographing unit, and the photographed images can be displayed on a screen of the radiotelephone. In addition, through a connection with a personal computer (PC), data of the photographed images can be downloaded.

Recently, radiotelephones with a built-in lens assembly which has various additional functions that is installed outside of their folders have been introduced, thus allowing photographing of a subject using the lens assembly without opening the folders.

However, if the lens assembly is installed on the hinge arm, there occurs a problem that there is a restriction of an area for installation of a hinge module for opening the folder by a predetermined angle. Further, even if the lens assembly is built in an outer face of the folder, there is a problem that the folder becomes too thick.

SUMMARY OF THE INVENTION

Accordingly, it is an object of the present invention to provide an antenna unit with a camera lens assembly for a portable radiotelephone, in which there is no restriction in an installation area for components of the radiotelephone and a subject is suitably photographed.

It is another object of the present invention to provide an antenna unit with a camera lens assembly for a portable radiotelephone, in which a subject can be suitably photographed without opening a folder.

It is a further object of the present invention to provide an antenna unit with a camera lens assembly for a portable radiotelephone, which is capable of contributing to miniaturization and reduction in weight.

Additional advantages, objects, and features of the invention will be set forth in the description which follows and will become apparent to those having ordinary skill in the art. The objectives and other advantages of the invention may be realized and attained by the structure disclosed in the written description and claims hereof, as well as the appended drawings.

To achieve these objects and other advantages in accordance with the purpose of the present invention, as described herein, there is provided a portable radiotelephone with an antenna unit protruded outwardly therefrom, wherein the antenna unit is connected via a feeding unit to a main body of the radiotelephone. The antenna unit has a camera lens assembly installed in its proper position and electrically connected to the main body so as to suitably photograph a subject.

Further, in accordance with the present invention, the antenna unit is installed to be rotatable by 360° so that a subject can be photographed at any desired angle and position. Moreover, since the antenna unit is installed in a manner that does not allow rotation by more than 360° with respect to the main body, a problem of a disconnection and a contact failure due to an excessive rotation of the antenna unit can be avoided.

Preferably, in accordance with the present invention, a position of the antenna unit is temporarily fixed when a user rotates the antenna unit to a desired position, thereby preventing a failure to photograph a subject due to an idle-running or a floating away from the desired position of the antenna unit.

More preferably, in accordance with the present invention, a transparent window is installed in a portion in which the camera lens assembly of the antenna unit is installed or the antenna unit uses a detachable protective cap to protect the camera lens assembly from foreign substances.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. It will be apparent to those skilled in the art that various modifications and variations can be made in the present invention. Thus, it is intended that the present invention cover the modifications and variations of this invention within the scope of the present invention.

Although there is illustrated and described herein a folder type radiotelephone in which a folder acting as a sub body is opened/closed on a main body by a predetermined angle or a folder is rotated in a direction perpendicular to an opening/closing direction, the present invention is also applicable to any radiotelephone having an antenna unit protruded outwardly therefrom, generally a helical antenna type (however, it is not limited to that), for example, a general bar type radiotelephone, a flip type radiotelephone, a flip-up type radiotelephone, and various radio communication equipment such as a personal digital assistant (PDA).

Figure 1:
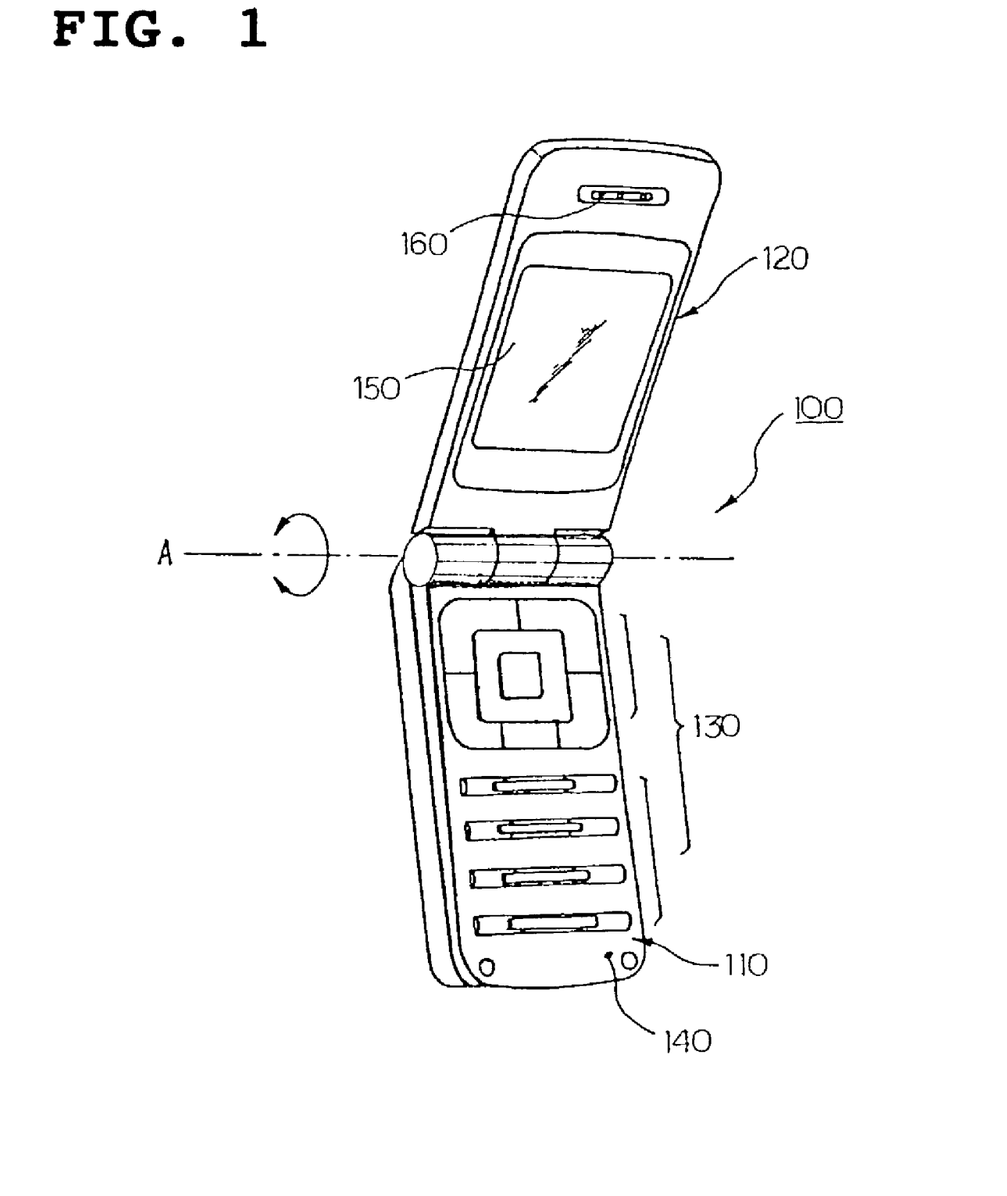
FIG. 1 is a perspective view of the front of a portable radiotelephone in accordance with the present invention.
Figure 2:
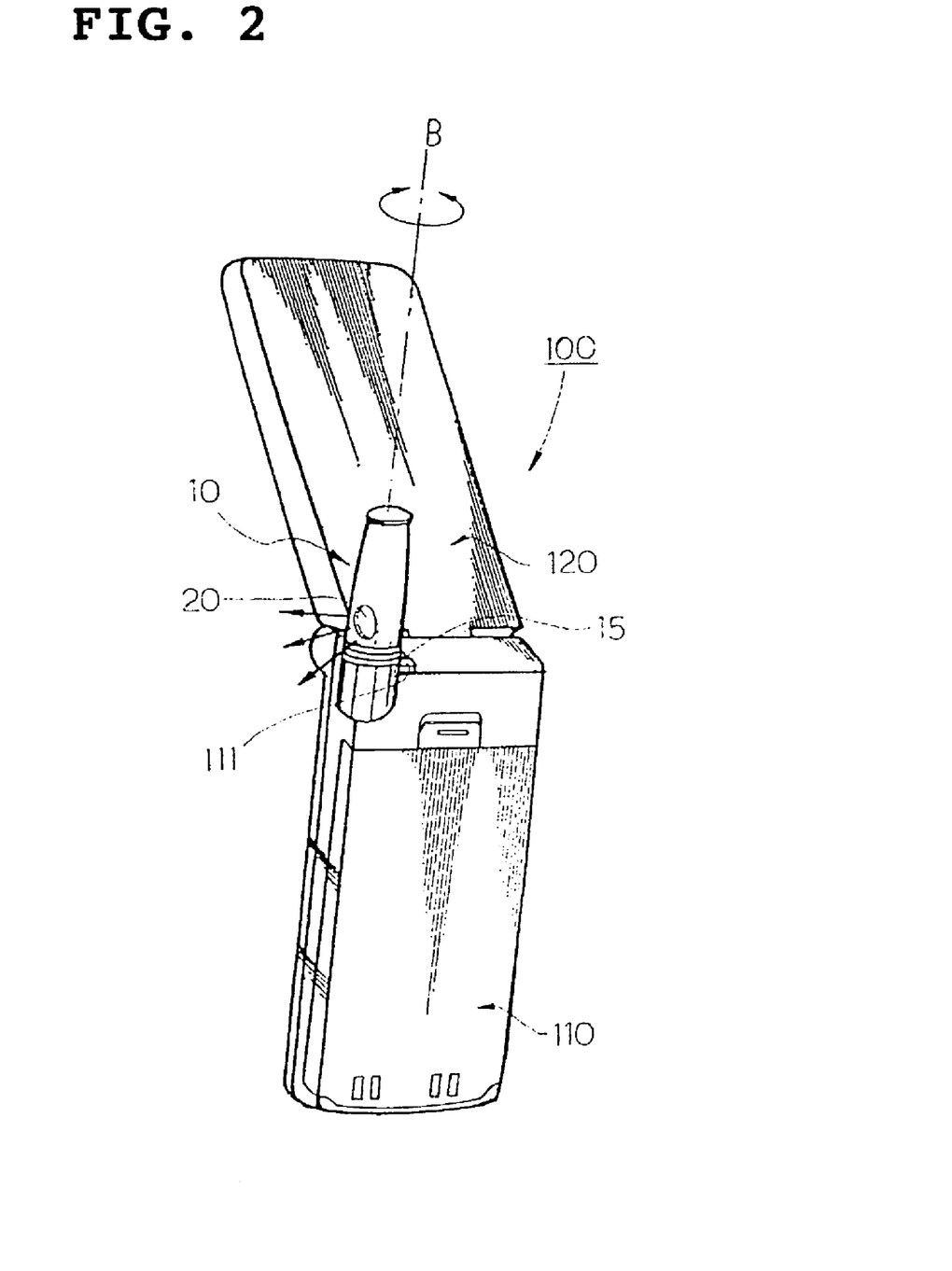
FIG. 2 is a perspective view of the back of the portable radiotelephone of FIG. 1 showing an antenna unit with a lens assembly in accordance with an embodiment of the present invention.

FIG. 1 is a perspective view of the front of a portable radiotelephone in accordance with the present invention, and FIG. 2 is a perspective view of the back of the portable radiotelephone of FIG. 1 showing an antenna unit with a lens assembly in accordance with an embodiment of the present invention. Referring to FIGS. 1 and 2, the portable radiotelephone 100 comprises a main body 110, a folder 120 as a sub body, and a hinge module (not shown) for allowing the folder 120 to be opened by a predetermined angle around an axis A (shown in FIG. 1) on the main body 110.

A keypad assembly 130 consisting of a plurality of key buttons is installed on the main body 110. The keypad assembly 130 can be provided with a plurality of numeric key buttons on its lower portion and navigation key buttons on its upper portion. In addition to the radiotelephone function, the navigation key buttons are used to perform various functions such as Internet retrieval and manipulation of the camera lens assembly when photographing a subject using a digital camera or camcorder function. A microphone unit 140 acting as a transmitter is installed below the keypad assembly 130 so that the user's voice can be transmitted to the other party in a telephone call.

A display unit 150 is installed in the folder 120. The display unit 150 can be a wide color LCD module or preferably a touch screen module. A speaker unit 160 acting as a receiver is installed above the display unit 150 so that the other party's voice received in a telephone call can be reproduced to the radiotelephone user.

An antenna unit 10 is installed in a rear upper portion of the main body 110. The antenna unit 10 can be electrically connected to the main body 110 for smoothly transmitting and receiving a signal. The antenna unit 10 that is preferably installed is a helical type antenna that is embedded in an injection material by an insert molding. A camera lens assembly 20 for photographing a subject is installed in a proper position of an outer circumference of the antenna unit 10. In order to photograph a subject at various positions and angles, the antenna unit 10 is preferably installed to allow rotation up to 360° around an axis B shown in FIG. 2. The camera lens assembly 20 also rotates together with the antenna unit 10. Accordingly, a user opens the folder 120 and adjusts the antenna unit 10 to a desired angle in a state that the display unit 150 displays images being photographed. Then, a subject can be easily photographed.

Figure 3:
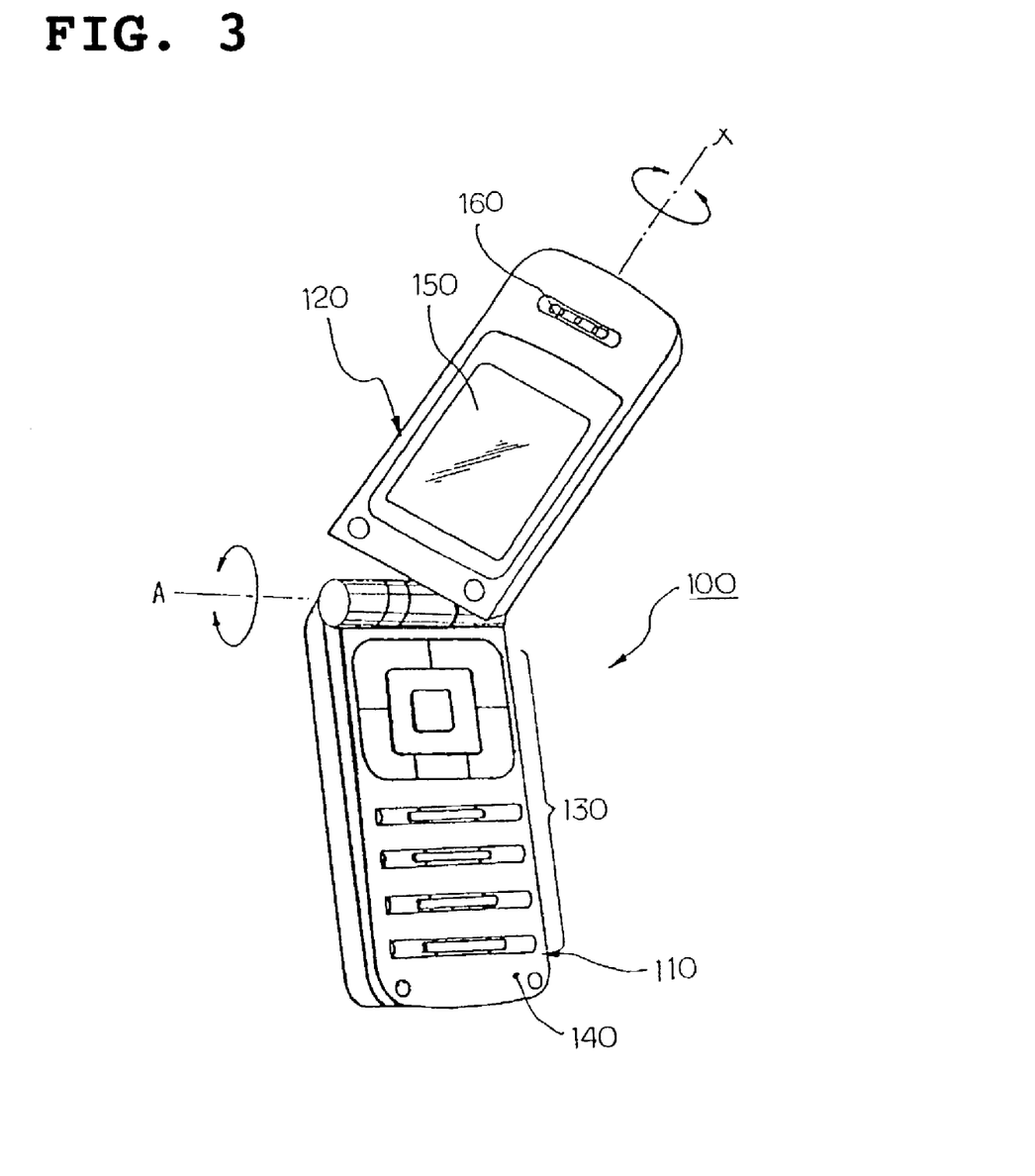
FIG. 3 is a perspective view of a portable radiotelephone in accordance with another embodiment of the present invention.
Figure 4:
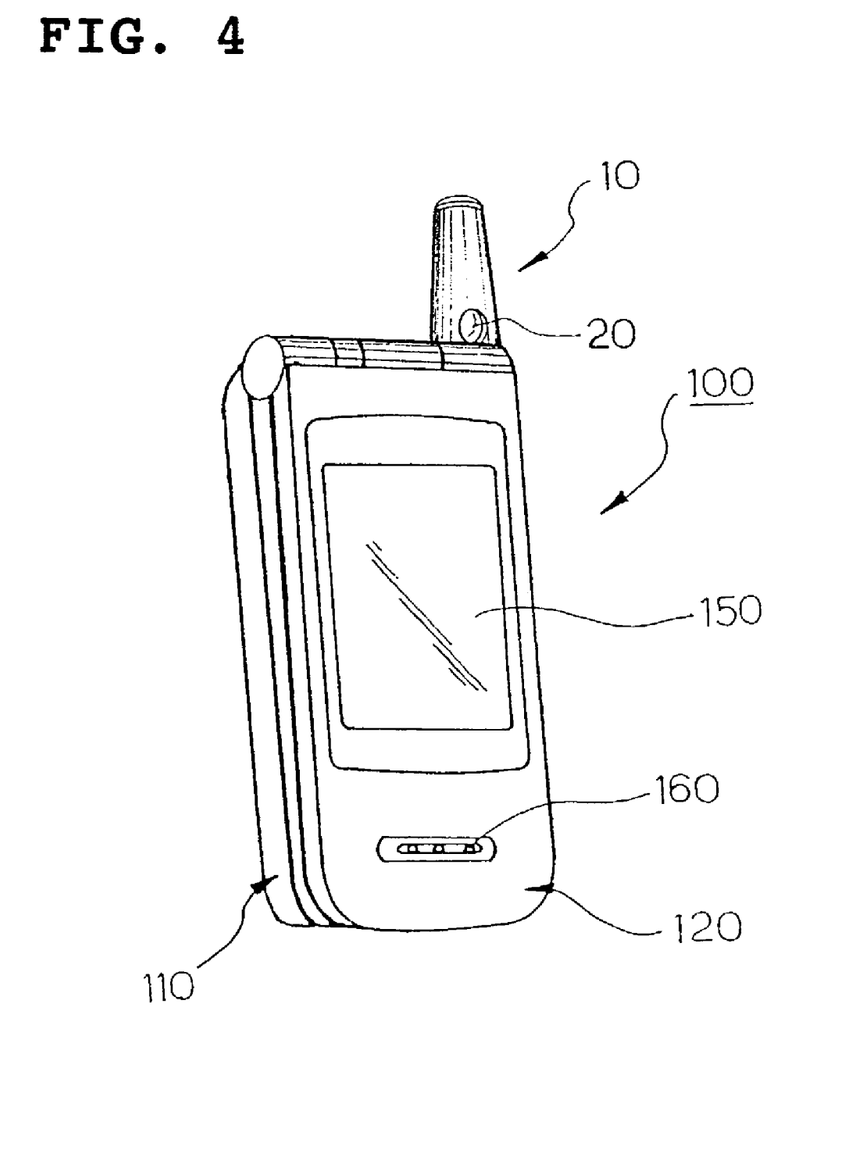
FIG. 4 is a view showing an operation state of the portable radiotelephone shown in FIG. 3.

FIG. 3 is a perspective view of a portable radiotelephone in accordance with another embodiment of the present invention, and FIG. 4 is a view showing an operation state of the portable radiotelephone shown in FIG. 3. The antenna unit 10 of the present invention is more preferable when it is applied to a rotary rotation mode in which the folder 120 is rotatable around an X-axis, wherein the X-axis is perpendicular to the axis A. In other words, after rotating the folder 120 by 180° about the X-axis to face the display unit 150 in an outward direction, as shown in FIG. 4, the antenna unit 10 is rotated to a desired angle and then a subject is photographed. Consequently, the photographing function can be performed without opening the folder 120. For example, such a structure is suitable for image communications with the other party.

Figure 5:
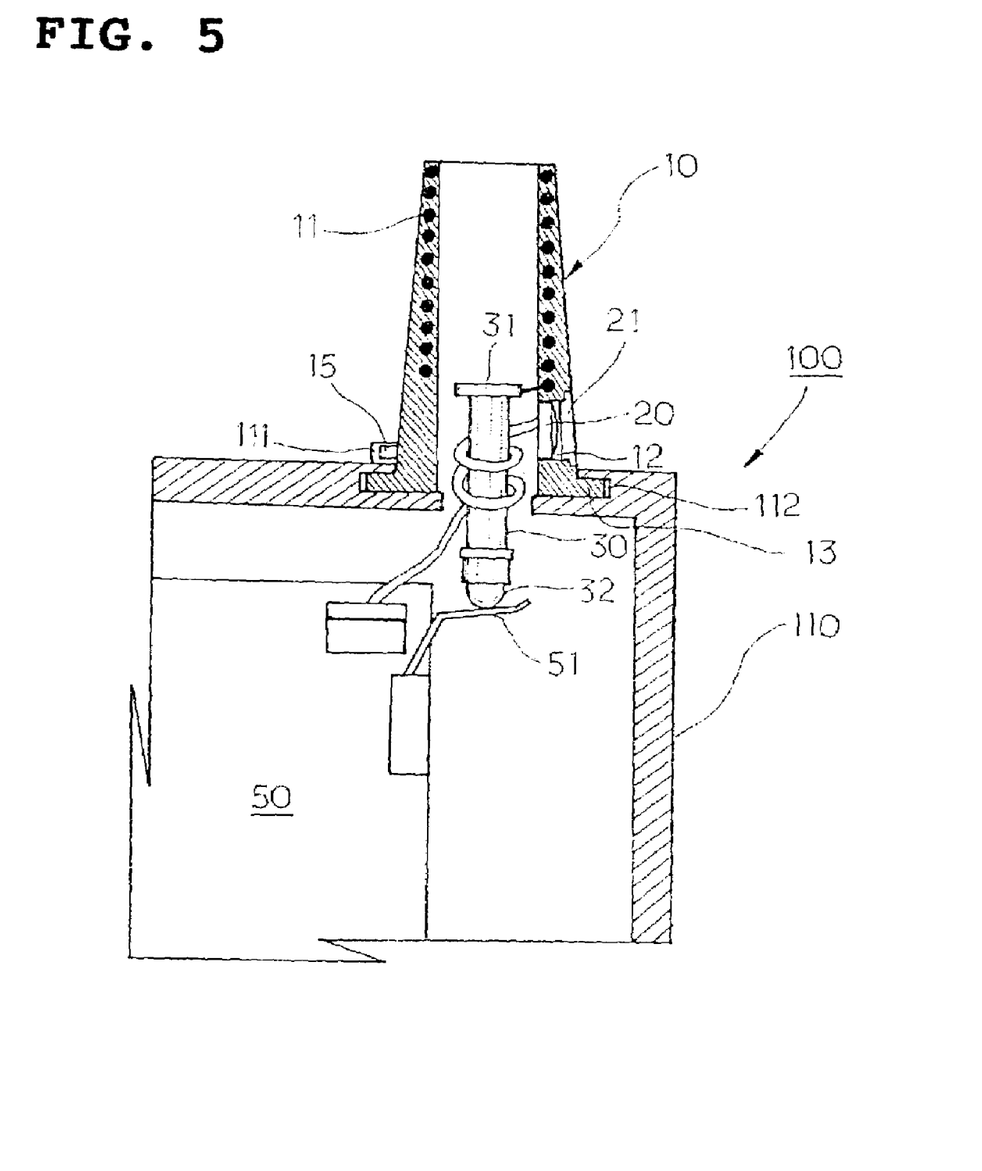
FIG. 5 is a cross-sectional view of an antenna unit with a lens assembly in accordance with an embodiment of the present invention.
Figure 6:
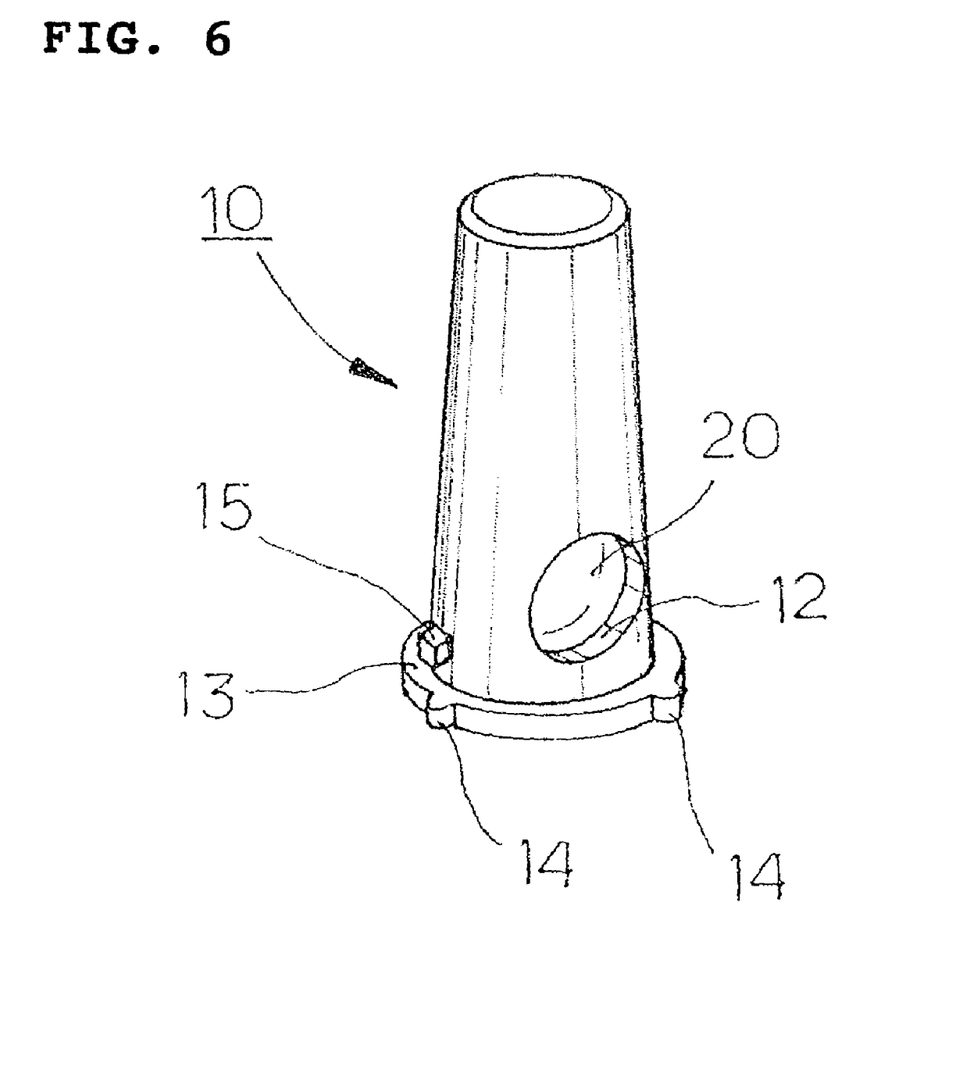
FIG. 6 is a perspective view of an antenna unit in accordance with an embodiment of the present invention.
Figure 7:
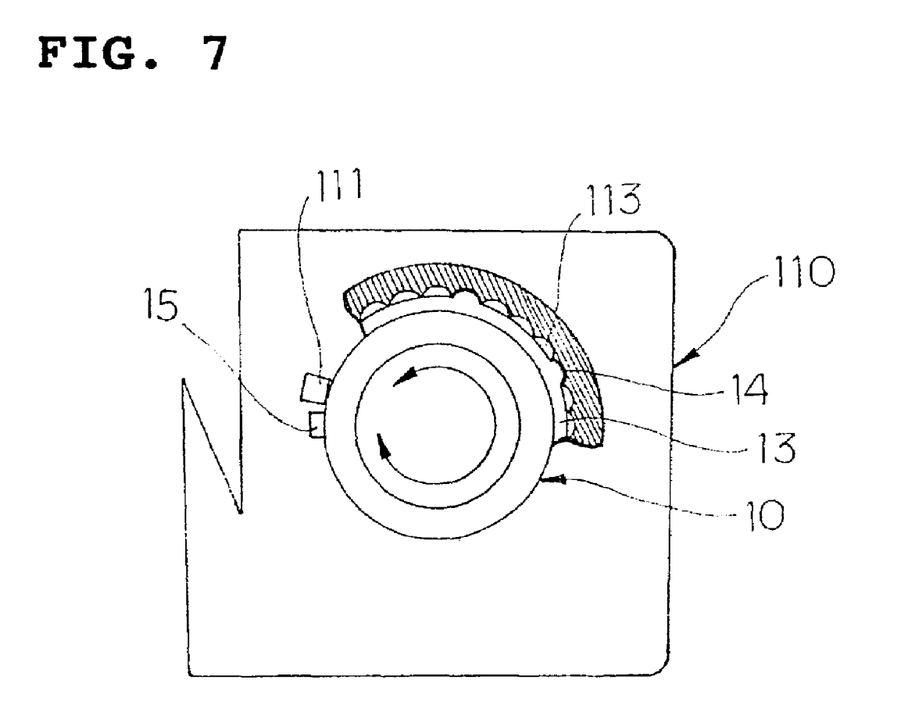
FIG. 7 is a partial cross-sectional view showing a connection structure between the antenna unit and the main body in accordance with an embodiment of the present invention.

FIG. 5 is a cross-sectional view of the antenna unit with a lens assembly in accordance with an embodiment of the present invention, and FIG. 6 is a perspective view of the antenna unit in accordance with an embodiment of the present invention. FIG. 7 is a partial cross-sectional view showing a connection structure between the antenna unit and the main body in accordance with an embodiment of the present invention. Referring to FIGS. 5 to 7, the antenna unit 10 includes the camera lens assembly 20. The camera lens assembly 20 can be fixedly inserted into a punched opening 12 disposed in a lower portion of the antenna unit 10. The camera lens assembly 20 is preferably connected to a printed circuit board (PCB) 50 via an electrical connection unit. An elaborate cable or a flexible printed circuit (FPC) is preferably used as the electrical connection unit. In addition, a transparent window 21 can be installed in the opening 12 of the antenna unit 10 so as to protect the lens of the camera lens assembly from foreign substances. Preferably, by making an outer face of the window 21 correspond to an outer circumference of the antenna unit 10, the outer appearance of the antenna unit 10 is made elegant.

If the antenna unit 10 is installed on the main body 110, it can rotate within 360°, but a rotation of more than 360° is not desired. If the antenna unit 10 rotates by more than 360°, the cable or the flexible printed circuit, which is electrically connected to the main body 110, may be twisted off, thus causing a disconnection or a contact failure. As a result, a malfunction or an erroneous operation of the radiotelephone 100 may occur. To avoid rotation beyond 360°, the antenna unit 10 has a stepped portion 13 formed in its lower portion wherein a diameter of the stepped portion is larger than that of the antenna unit. The antenna unit 10 is fixed to a fixing portion 112 formed in the main body 110 to limit rotation and prevent separation. At this time, a protruded projection 15 is formed in a proper position on the outer circumference of the antenna unit 10. A protruded engagement projection 111 that engages the projection 15 is formed on the main body 110 within the rotation range of the projection 15, so that the rotation is limited to 360° or less.

In addition, in accordance with the present invention, when photographing a subject, the antenna unit 10 can be prevented from being randomly rotated or moved. After rotating the antenna unit to a predetermined angle, the adjusted position can be temporarily fixed, thereby obtaining an excellent photographing result. In other words, an outwardly protruded projection 14 is formed on the stepped portion 13 of the antenna unit 10, and a plurality of grooves 113 (FIG. 7) with which the projection 14 engages are formed in the fixing portion 112 (FIG. 5) of the main body 110 at regular intervals. As a result of this, if a constant rotational force is not applied to the antenna unit 10, the projection 14 of the antenna unit 10 cannot separate from the grooves 113 of the main body 110. A unit rotation angle (i.e. an angle between one groove and the next groove) of the antenna unit 10 is established according to the intervals of the grooves 113. Preferably, the surface of the grooves 113, which contact the projection 14, are formed in a curved shape. The surface of projection 14 is preferably also formed in a curved shape. Therefore, when a constant rotational force is applied to the antenna unit 10, the antenna unit 10 can be smoothly rotated.

Meanwhile, the present invention uses an antenna unit including a helical antenna 11 embedded in an injection material by an insert molding. The helical antenna 11 is electrically connected via a feeding unit to a connecting terminal 51 installed in the main body 110. A metallic feeding pin 30 having a predetermined length is used as the feeding unit. The feeding pin 30 has the one end 31 electrically connected to one end of the helical antenna 11 and the other end 32 connected to the connecting terminal 51 installed in the printed circuit board (or an RF board) 50 of the main body 110. The feeding pin 30 can be fixed to the main body 110. Preferably, one end 32 of the feeding pin 30 includes a ball plunger that allows rotation of the antenna unit 10 and undisturbed feeding operation even when an external impact is applied to the radiotelephone 100. More preferably, the connecting terminal 51 that electrically contacts the ball plunger can be arranged as a plate-type spring, as shown in FIG. 5.

In addition, the electrical connection of the helical antenna 11 and the feeding pin 30 is preferably disposed above the position in which the camera lens assembly 20 is installed. Thus, the antenna unit 10 properly operates and the camera lens assembly 20 performs a suitable photographing of a subject without mutual interference.

Figure 8:
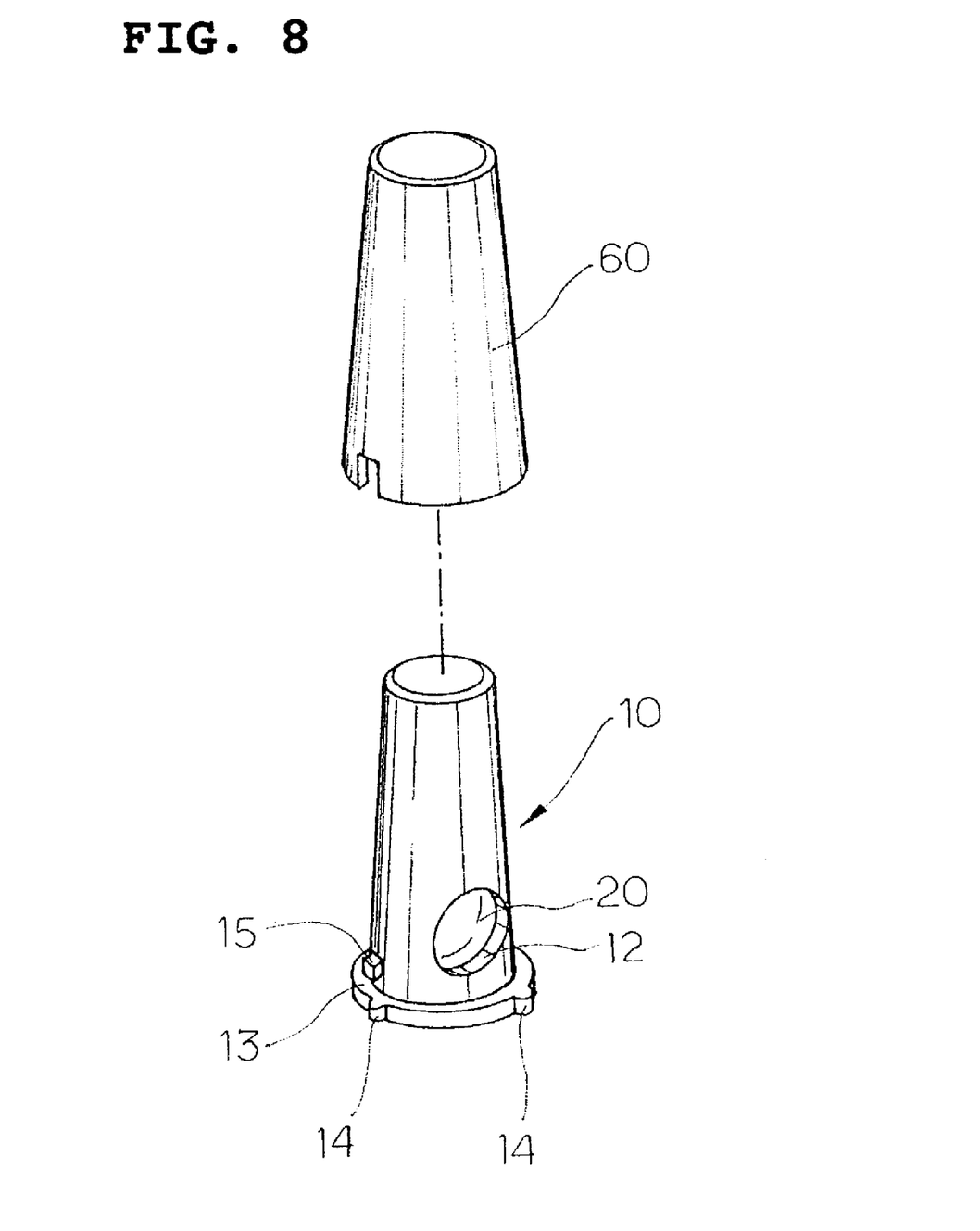
FIG. 8 is a view of an antenna unit in accordance with another embodiment of the present invention.

FIG. 8 is a view of an antenna unit in accordance with another embodiment of the present invention. A detachable protective cap 60 can be further installed on an upper portion of the antenna unit 10. When not in use, the camera lens assembly 20 can be protected by mounting the protective cap 60 on the antenna unit 10. More preferably, the protective cap 60 is formed of a transparent material so that the camera lens assembly 20 may be properly operated even when the protective cap 60 is mounted on the antenna unit 10.

Since the camera lens assembly is installed in the antenna unit, an additional area in which a camera lens assembly is to be installed is unnecessary, thus attributing to the miniaturization and reduction in weight of the radiotelephone. In addition, installation of the camera lens assembly in the most protruded portion of the radiotelephone allows a subject to be is properly and accurately photographed.

Structure and operation according to the embodiment of the present invention as described above may be achieved. It will be apparent to those skilled in the art that various modifications and variations can be made in the present invention. Thus, it is intended that the present invention cover the modifications and variations of this invention, as defined by the scope of the appended claims and their equivalents.

What is claimed is:

1. An antenna unit for a portable radiotelephone, the antenna unit outwardly protruding from the portable radiotelephone, comprising a feeding unit connecting the antenna unit to the main body, and a camera lens assembly housed within the antenna unit and electrically connected to the main body so as to allow photographing of an outside subject, wherein the antenna unit and the camera lens assembly are rotatably installed on the portable radiotelephone to rotate about a longitudinal axis of the antenna unit.

2. The antenna unit as claimed in claim 1, wherein the antenna unit includes, at a lower portion, a stepped portion of larger diameter than the remainder of the antenna unit, wherein the stepped portion functions to fix the antenna unit, via a fixing portion of the main body, to the main body and allows the antenna unit to be rotatable with respect to the main body.

3. The antenna unit as claimed in claim 1, wherein at least one projection outwardly extends from a stepped portion of the antenna unit and a plurality of grooves are formed at regular intervals on a fixing portion of the main body contacted with the stepped portion of the antenna unit, to allow stable adjustment of the antenna unit.

4. The antenna unit as claimed in claim 3, wherein the projection is formed in a curved shape so that the antenna unit can move smoothly between the plurality of grooves in the fixing portion of the main body.

5. The antenna unit as claimed in claim 1, wherein a protruded projection protrudes from an outer circumference of the antenna unit and an engagement projection is formed on the main body within a rotation range of the protruded projection, thereby restricting a rotation of the antenna unit to 360° or less.

6. The antenna unit as claimed in claim 1, wherein the camera lens assembly is installed on an opening punched in an outer circumference of the antenna unit, and a transparent window is attached to the outermost side of the opening to protect the camera lens assembly.

7. The antenna unit as claimed in claim 1, wherein the antenna unit includes a helical type antenna embedded therein.

8. The antenna unit as claimed in claim 7, wherein the feeding unit further comprises a feeding pin having a predetermined length having one end electrically connected to the helical antenna and another end electrically connected to a connecting terminal of a printed circuit board of the main body.

9. The antenna unit as claimed in claim 8, wherein the feeding pin further includes a ball plunger in one end thereof, wherein the ball plunger is connected electrically to the connecting terminal of the main body.

10. The antenna unit as claimed in claim 8, wherein the camera lens assembly is electrically connected to the printed circuit board of the main body via a flexible printed circuit having a predetermined length.

11. The antenna unit as claimed in claim 10, wherein the flexible printed circuit is wound at least once around the feeding pin to allow for rotation of the antenna unit.

12. The antenna unit as claimed in claim 8, wherein the electrical connection of the helical antenna and the feeding pin is disposed above the camera lens assembly, thereby preventing mutual interference.

13. The antenna unit as claimed in claim 1, wherein a detachable protective cap is installed on an upper portion of the antenna unit to protect the camera lens assembly of the antenna unit.

14. The antenna unit as claimed in claim 13, wherein the protective cap is formed of a transparent material so that the camera lens assembly can photograph a subject when the protective cap is installed.

15. The antenna unit as claimed in claim 1, wherein the antenna unit and the camera lens assembly rotate about a longitudinal axis of the portable radiotelephone.

16. A portable telephone, comprising:
- a main body having a longitudinal axis;
- a rotatably mounted antenna housing having at least one antenna therein; and
- a camera assembly mounted in the antenna housing including a camera lens mounted on an outer surface of the antenna housing, the camera assembly and antenna housing being rotatable about a longitudinal axis of the antenna housing.

* * * * *

UNITED STATES PATENT AND TRADEMARK OFFICE
CERTIFICATE OF CORRECTION

| | | |
|---|---|---|
| PATENT NO. | : 6,975,273 B1 | |
| DATED | : December 13, 2005 | |
| INVENTOR(S) | : Chi-Jeong Choi | |

It is certified that error appears in the above-identified patent and that said Letters Patent is hereby corrected as shown below:

<u>Title page,</u>
Insert Item -- [30] Foreign Application Priority Data
              December 24, 2002 (KR) ............... 2002-0083083 --.

Signed and Sealed this

Sixth Day of June, 2006

JON W. DUDAS
*Director of the United States Patent and Trademark Office*